Nov. 11, 1941.  J. D. KENNELLY  2,262,239

SIGNAL LIGHT

Filed Sept. 17, 1936  10 Sheets-Sheet 1

Inventor:
Jeremiah D. Kennelly

Nov. 11, 1941.  J. D. KENNELLY  2,262,239
SIGNAL LIGHT
Filed Sept. 17, 1936  10 Sheets-Sheet 5

Nov. 11, 1941.   J. D. KENNELLY   2,262,239
SIGNAL LIGHT
Filed Sept. 17, 1936   10 Sheets-Sheet 7

Inventor:
Jeremiah D. Kennelly,
By Dyrenforth, Lee, Chritton & Wiles
Attorneys

Nov. 11, 1941.  J. D. KENNELLY  2,262,239
SIGNAL LIGHT
Filed Sept. 17, 1936  10 Sheets-Sheet 8

Inventor:
Jeremiah D. Kennelly,
By Dyrenforth, Lee, Chritton & Wiles
Attorneys

Patented Nov. 11, 1941

2,262,239

UNITED STATES PATENT OFFICE 2,262,239

SIGNAL LIGHT

Jeremiah D. Kennelly, Oak Park, Ill.

Application September 17, 1936, Serial No. 101,333

6 Claims. (Cl. 177—329)

This invention relates to a lamp structure, and more particularly to lamp structure suitable for use as a signal lamp at railroad and highway crossings and other intersections.

An object of the invention is to provide a lamp adapted to project oscillating beams of light in diverging directions, one of the beams serving to illuminate an object and another serving as a signal beacon to attract attention to the object illuminated.

Another object of the invention is to provide a lamp which may be placed in the vicinity of a railroad crossing and which is capable of projecting a moving beam of light across the highway as a warning to operators of highway vehicles, while at the same time projecting a beam of light on an approaching train so that the outlines of the train can be seen at night by the operator of the highway vehicle.

A further object is to provide a lamp which can be adjusted for use under varying conditions and which is so constructed as to easily withstand adverse weather conditions to which such a lamp is likely to be exposed. A still further object is to provide a lamp of the oscillating type which is dependable and equipped with alternate equipment for insuring against its failure. Other objects and advantages will appear as the specification proceeds.

A preferred embodiment of the invention is shown in the accompanying drawings in which—

As illustrated in the accompanying drawings, A designates a lamp casing; B, the reflectors equipped with suitable electric bulbs; C, a motor; D, drive mechanism for oscillating the lamp; E, drive mechanism for tilting one of the reflectors; and F, a trouble control system for actuating spare equipment and for signal purposes.

The casing A may be of any suitable material, preferably metal. It provides two main openings, 10 and 11, facing different directions, opening 10 being to accommodate the signal light and opening 11 for the accommodation of the beacon. These openings are preferably circular for the accommodation of circular reflectors, but other forms may be used if so desired.

Figure 1:
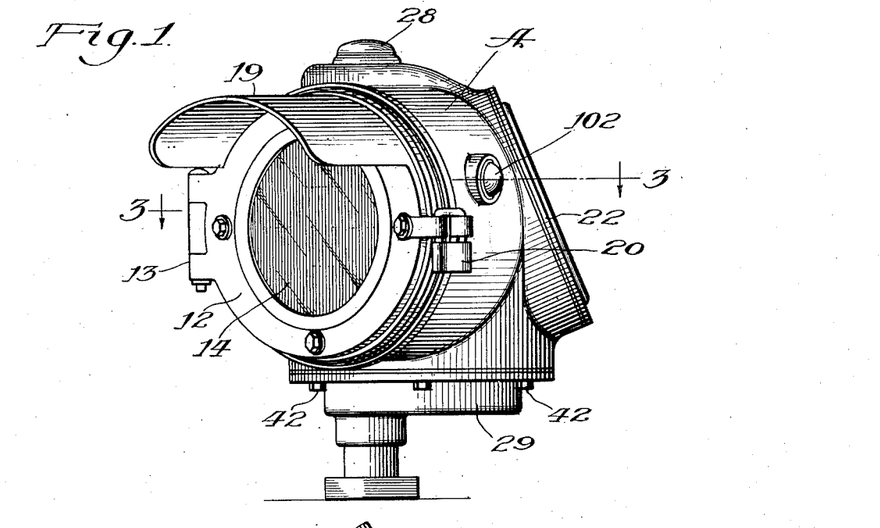
Fig. 1 is a side view in elevation of the lamp fully assembled.
Figure 2:
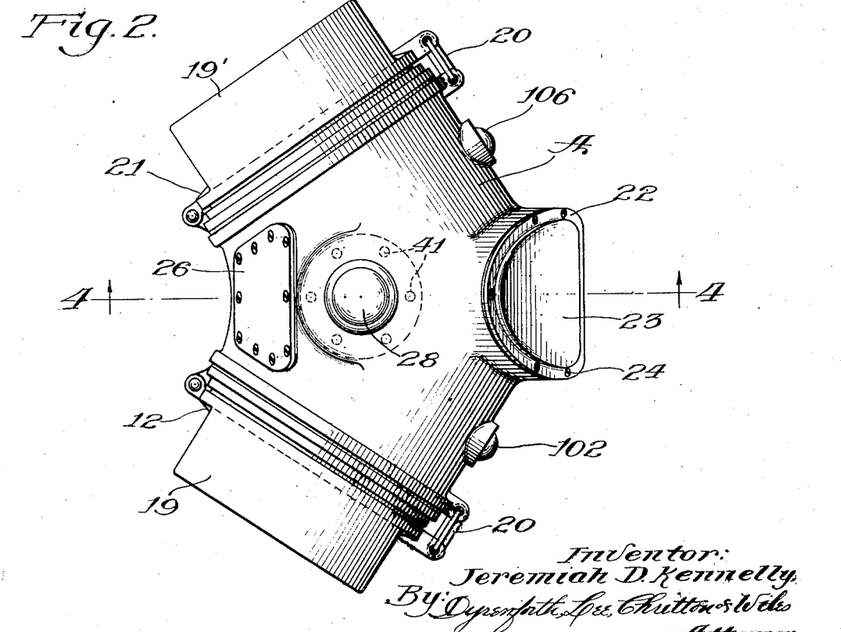
Fig. 2, a plan view of the assembled lamp.
Figure 18:
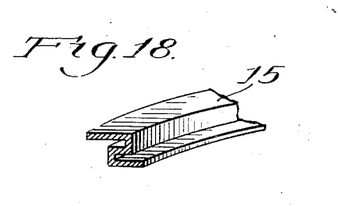
Fig. 18, a detail view showing a fragment of the lens gasket.

Fitted within opening 10 is a sleeve member 31 secured by means of lugs 32 and 33 and bolts 34, which means serves to draw the sleeve against washer 35 for forming a tight joint. A door 12 is attached to sleeve 31 on one side by the hinge 13 and is arranged to swing about hinge 13 to allow access to the casing through the sleeve member 31. The door 12 is provided with the glass lens 14 which is securely fastened within the door, the edge of the lens being enclosed in a lens gasket 15, shown in detail by Fig. 18, which may be made of rubber or other resilient material. This gasket serves the double purpose of securing the lens and providing a tight joint between the door and sleeve 31. The frame of door 12 is composed of an outer rim 16 and ring 18. In the assembly of the door lens 14 may be inserted into the inner circular socket of the lens gasket and ring 18 inserted within the outer socket. The outer rim 16 and ring 18 are then drawn together by small screws to securely bind the lens and lens gasket. This structure provides a very firm joint which is water-tight and which at the same time imposes no strain on the lens.

Since the light to be passed through lens 14 is used for signal purposes, this lens may be made of red colored glass or other material which is unusual or effective in attracting attention.

Attached on the side of door 12 opposite hinge 13 is a latch or lock 20 for holding the door closed; a lock such as shown in Fig. 1, by which the door is locked to the main body of the casing, is preferable in order to prevent unauthorized persons from gaining entrance to the lamp. If desired the shields 19 and 19' may be attached to the doors as protection against falling sleet and hail.

A sleeve member 36, similar to member 31, is fitted within opening 11, and is secured in the same manner. The door 21, closing the outer end of sleeve 36 is preferably identical to door 12. The lens 14ª is preferably of clear glass rather than the red colored glass of lens 14. Since the beam of light passing through opening 11 is for the purpose of illumination, white light rays are more desirable.

Casing A extends rearwardly of openings 10 and 11 and forms a housing for the reflectors, the motor, and the driving mechanisms. At the rear of the casing a manhole 22 is provided for gaining access to the rear of the casing interior. The cover 23 attached by bolts 24 with gasket 25 interposed effectively closes the manhole against water or moisture. Manhole 26, covered similarly as manhole 22, is provided for gaining access to the front portion of the casing interior.

The casing is mounted upon a hollow shaft 27, and both the top piece 28 and the bottom piece 29 contain bearings through which the casing is pivotally secured to shaft 27. Piece 28 is fitted into an opening in the top of the casing and has a rim which may be attached to the inside of the casing. A recess within piece 28 encloses a top shaft bearing 37 through which the top portion of shaft 27 extends. Bearing 37 may consist of the concentric annular pieces which are spaced apart by balls 39 in annular grooves. Other types of bearings may be used, however, if desired. A plate 40 is placed beneath piece 28 and fastened together with it to the casing by bolts 41, the purpose of the plate being to prevent leakage of lubricant from the bearing down into the lamp interior.

Bottom piece 29 is secured to the main body of the casing by bolts 42 with a gasket 43 interposed. A manhole 44 having a cover 45 is provided for gaining access to the oscillating mechanism without removing piece 29. A lower bearing 46 similar to the top bearing 37, and through which the shaft 27 extends, is firmly secured within piece 29 by a threaded plug 47 which screws into piece 29 to hold the bearing secure. Plug 47 has its top portion cut away on the inside and makes contact only with the outer portion of bearing 46, so that the casing makes frictional contact with the shaft only through balls 39 of the bearings. Fibrous material 38 may be inserted about the bearings for holding oil, if so desired.

Figure 3:
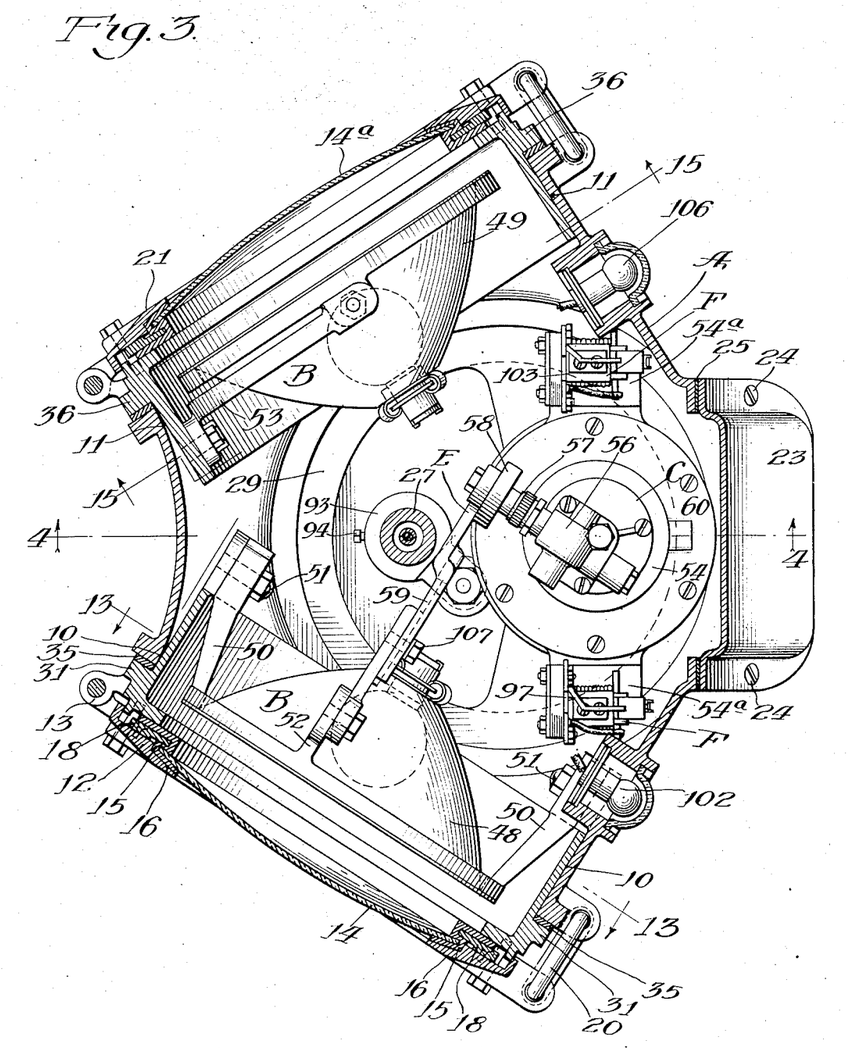
Fig. 3, a plan view of the interior of the lamp, the casing being shown in section as indicated at line 3—3 of Fig. 1.

Reflectors B consist of a signal reflector 48 and a beacon reflector 49. The signal reflector 48 is of common parabolic form and is equipped with an electric bulb having two filaments. At its sides are the ears 50, more clearly shown in Fig. 3, which are pivotally attached to sleeve 31 by means of bolts 51. At the top of reflector 48 a lug 52 provides means for connecting the arm of the tilting mechanism.

Figure 17:
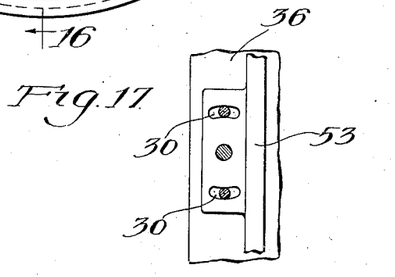
Fig. 17, a detail view showing the adjustable reflector fastening means.

Beacon reflector 49 is of similar form and is similarly equipped, but differently mounted. It is pivotally attached at top and bottom to the ends of a semi-circular arm 53 which is attached at one side to sleeve member 36. Attachment of arm 53 is made by bolts extending through holes in arm 53 into the sleeve member 36. As shown more clearly by Fig. 17, upper and lower bolt holes may be in the form of slots as shown at character 30 in Fig. 17, to allow adjustment of the reflector about a horizontal axis. The pivotal attachment at the ends of arm 53 serves to allow adjustment about a vertical axis.

The motor C is an electric motor of generally well known construction and operation, and will be described only in connection with its mounting and drive connections. The motor casing 54 is provided with lugs 54ª by which it is secured to projection 55 formed integral with piece 29 of the lamp casing. Thus the motor casing is securely fastened to casing A.

At the top of the motor the vertical motor shaft is connected to suitable reduction gearing. In the illustrations given the reduction gearing 56 is of the worm gear type. Driven by gearing 56 is the horizontal shaft 57 equipped with wheel 58. Pivotally attached to wheel 58 at an eccentric position is the crank arm 59 which has its other end connected to lug 52 on reflector 48. The lower portion 60 of the motor casing is provided with an outward flange to which is attached a gear housing 61 enclosing the reduction gearing for the oscillating mechanism.

Figures 9, 12:
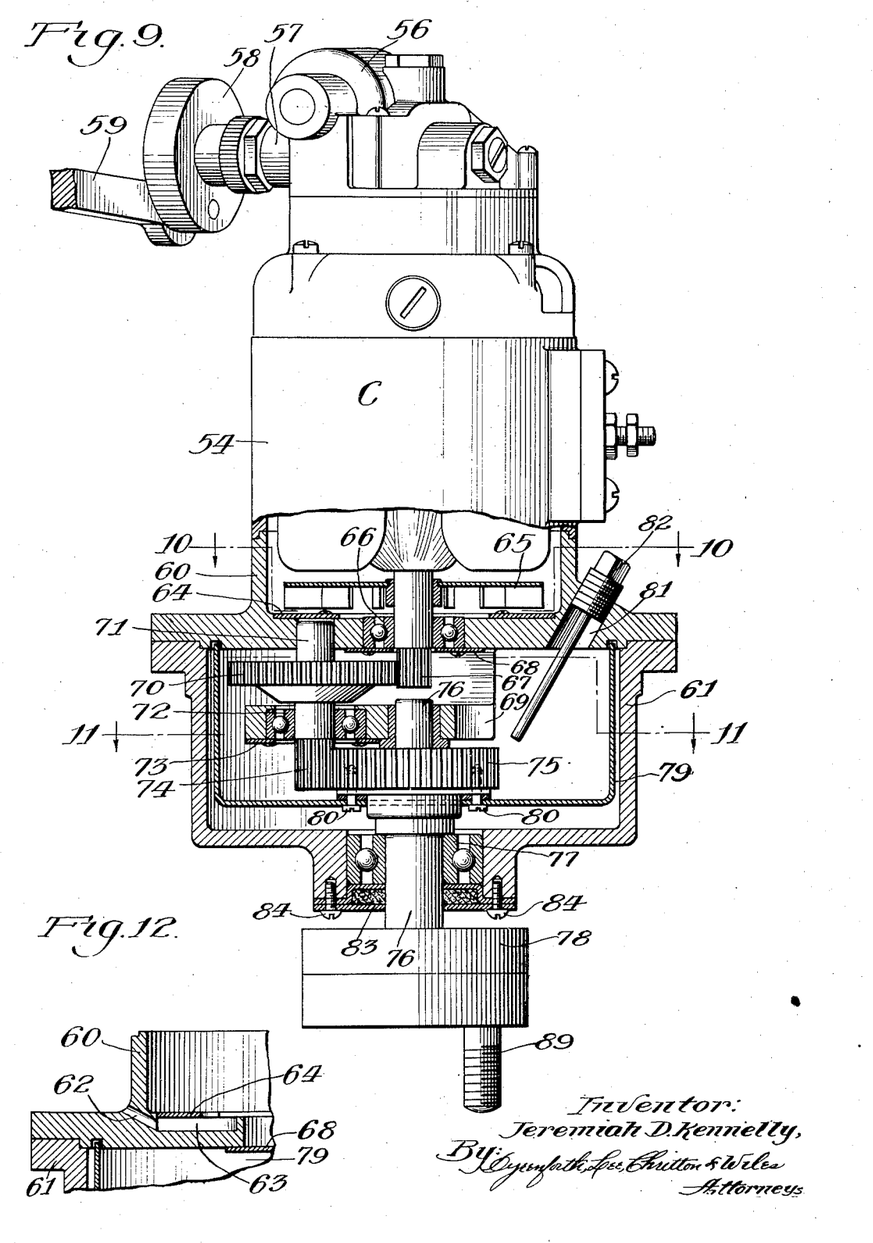
Fig. 9, a view in side elevation of the motor and gearing mechanisms, the lower portion of the casing being shown in section to expose the gear arrangement.
Fig. 12, a fragmentary view showing the air vents to the motor, the view being taken as indicated at line 12—12 of Fig. 10.
Figure 10:
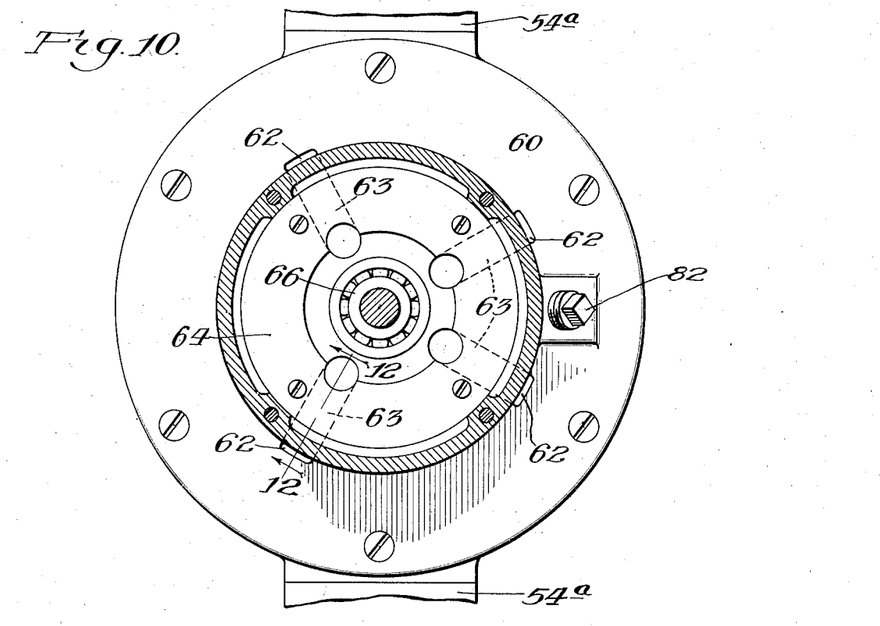
Fig. 10, a plan sectional view of the motor and gear mechanism, the section being taken as indicated at line 10—10 of Fig. 9.
Figure 11:
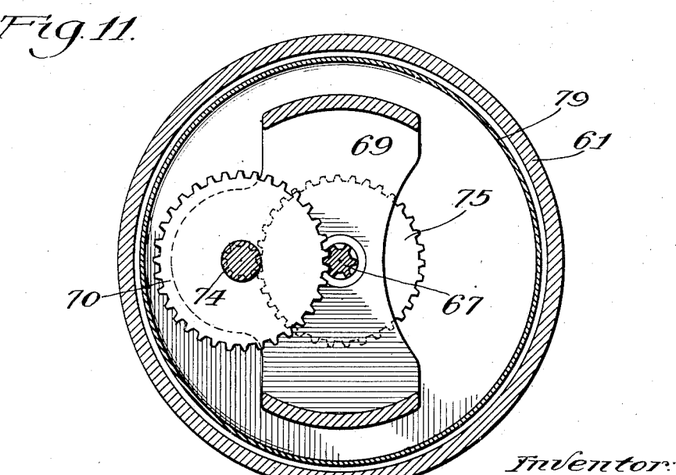
Fig. 11, a sectional view as indicated at line 11—11 of Fig. 9.
Figure 13:
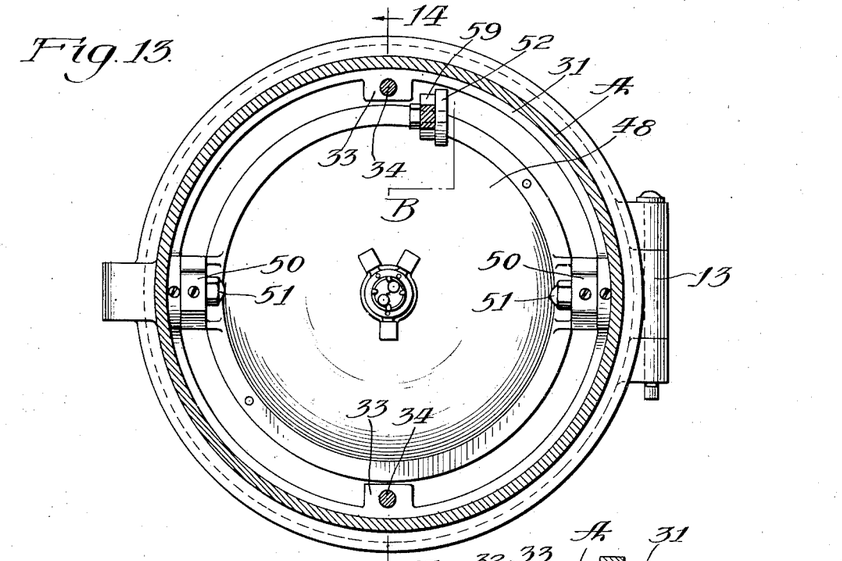
Fig. 13, an elevational view showing the signal reflector, the lamp casing being shown in section as indicated at line 13—13 of Fig. 3.
Figure 14:
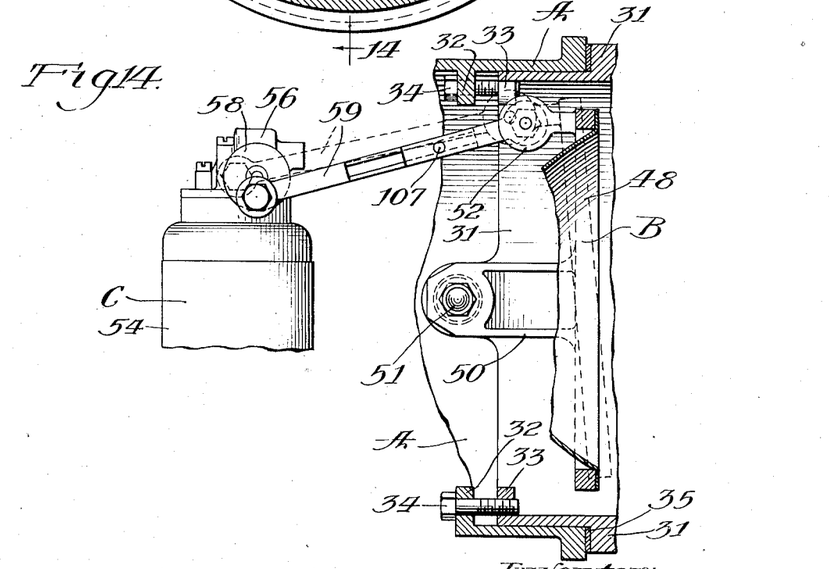
Fig. 14, a detail view as seen from line 14—14 of Fig. 13, and showing in solid lines the vertical position of the reflector and in dotted lines a tilted position of the reflector.
Figure 15:
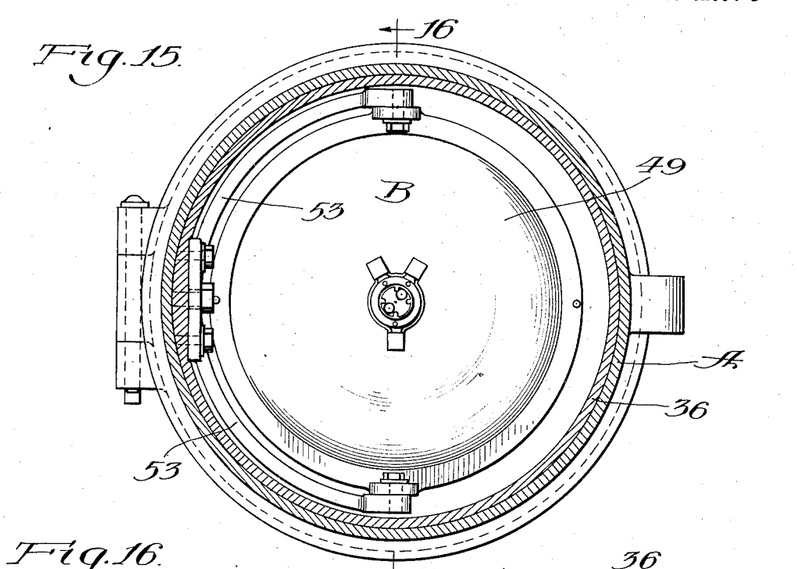
Fig. 15, an elevational view showing the beacon reflector, the lamp casing being shown in section as indicated at line 15—15 of Fig. 3.
Figure 16:
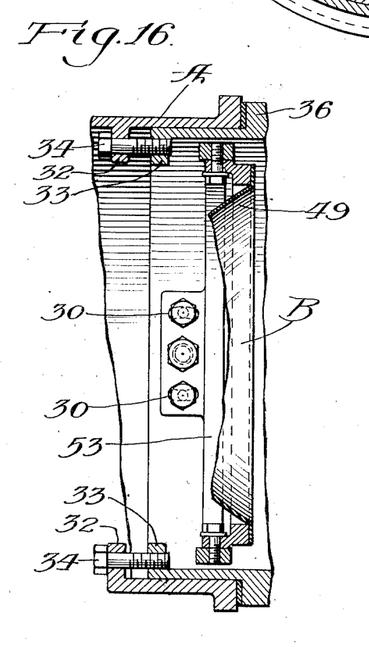
Fig. 16, a fragmentary view showing the means for attaching the beacon reflector, the lamp casing being sectioned at line 16—16 of Fig. 15.

As a means of admitting air to the lower end of the motor for cooling purposes, air vents consisting of passages 62 and rounded grooves 63 as shown more clearly by Fig. 12, are provided. The disk 64, which is just below the motor fan 65 and bolted to the motor casing, is cut away at its inside edge along the outlines of a semi-circle to allow free passage of air through the grooves to the interior of the motor casing.

The lower portion of the motor shaft extends through bearing 66 to the interior of the gear housing 61 where it terminates in the toothed pinion 67. A plate 68 is attached to casing portion 60 to support the bearing.

A gear supporting frame 69, which if seen in side elevation would appear as U-shaped, is joined at its top with the casing portion 60. The pinion 67 is in engagement with a spur gear 70 having a shaft 71 mounted in frame 69 through bearing 72. A plate 73 secures the outer ring portion of the bearing to frame 69. The upper end of shaft 71 is journaled in casing portion 60 and the lower end forms pinion 74 which in turn engages with gear 75. Gear 75 is mounted on shaft 76 which at its upper end is journaled in frame 69 and which at its lower portion is held by housing 61 through bearing 77, the lower end of the shaft being connected to cam wheel 78. Bearing 77 is held in place by plates 83 secured to housing 61 by bolts 84.

An oil pan 79 is fastened by means of bolts 80 to the underside of gear 75 and is arranged to revolve therewith. An oil hole 81 and plug 82 are provided in casing portion 60 for use in supplying pan 79 with oil.

Figure 7:
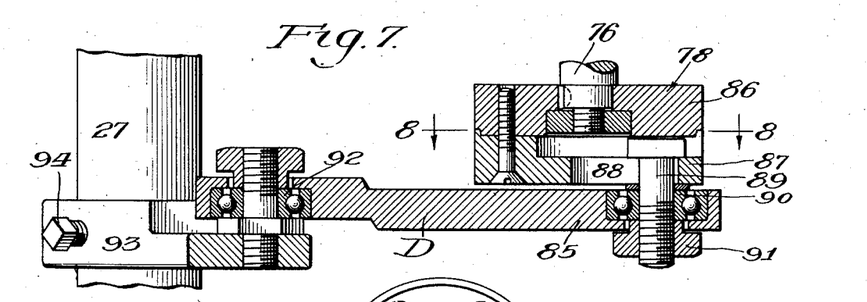
Fig. 7, a sectional view of the oscillating mechanism, the view being taken as indicated at line 7—7 of Fig. 6.
Figure 8:
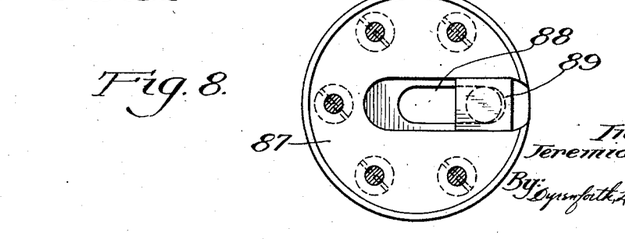
Fig. 8, a detail view of the cam in the oscillating mechanism, the view being in section as seen from line 8—8 of Fig. 7.

The cam wheel 78 and oscillating arm 85 form a part of the oscillating mechanism and are shown more clearly in Figs. 7 and 8. Wheel 78 is formed of two parts, the upper portion 86 being keyed to shaft 76 and the lower portion 87 being bolted to portion 86. Portion 87 is provided with a slot 88 within which a bolt 89 is fitted. Bolt 89 is secured to the inside of ball bearing 90 by the nut 91 screwed on its end. Tightening of nut 91 also serves to secure bolt 89 at one position in slot 88.

An end of arm 85 encloses the outside of bearing 90 and so is pivotally connected with bolt 89. The other end of arm 85 encloses the outside of ball bearing 92 the inside portion of which is secured to bracket 93 which is in turn rigidly secured to hollow shaft 27 by screw 94. The point at which arm 85 is pivoted on bracket 93 must not be in line with the centers of shafts 27 and 76, for this would cause a dead-center position which must be avoided here.

Figure 19:
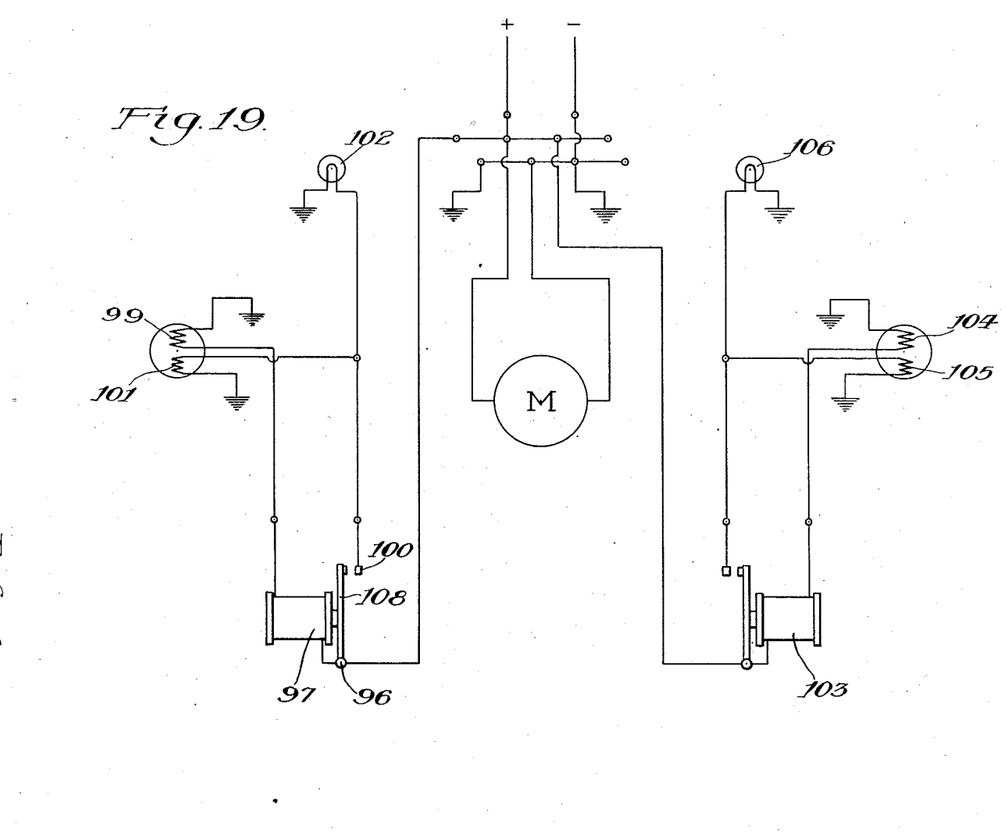
Fig. 19, a schematic wiring diagram of the electric circuit used in this embodiment.

The electric circuit used in this embodiment is shown schematically in Fig. 19. Electrical conductors are brought up into the lamp through hollow shaft 27 and connected to a terminal plate 95 within the casing. Wires leading from plate 95 provide an electrical path for energizing the motor. The electric circuit for the signal light is described by conductors leading from the positive terminal to post 96 of relay 97, through the winding of relay 97, and thence through conductors to filament 99 of the electric bulb in the signal reflector 48, and return to the negative terminal by way of ground on casing A.

An auxiliary circuit is provided for operation when the circuit through filament 99 is inoperative and relay 97 is de-energized. From terminal 100 of relay 97 connection is made through filament 101 to ground, and also through trouble lamp 102, in the side of the casing, to ground.

The electric circuit for the beacon light is arranged as that of the signal light, the main light circuit passing through the winding of relay 103 to the filament 104 to ground; and the auxiliary circuit passing from relay 103 through filament 105 to ground, and also through trouble lamp 106 to ground.

*Operation*

The shaft 27 of the lamp may be secured to any stationary object near the railroad crossing and the electric terminals connected to a source of electric current. Both the signal lamp circuit and the beacon lamp circuit will then be energized and the filaments 99 and 104 cause to glow. The reflectors B serve to focus the rays of light and project a beam in each of the two directions, the signal beam being red in color and the beacon beam white in color.

Figure 6:
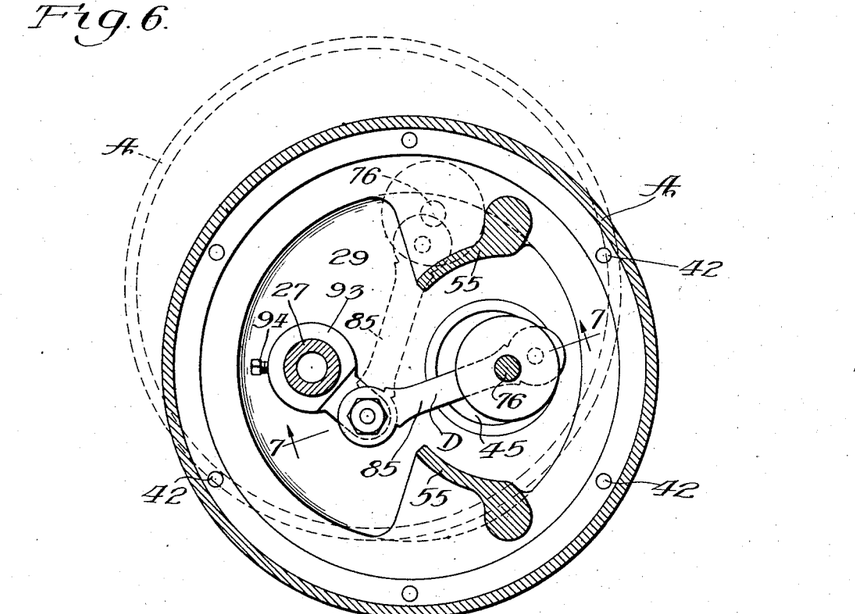
Fig. 6, a sectional view as seen from line 6—6 of Fig. 4, showing in full lines one extreme position of the casing and in dotted lines the other extreme casing position.

At the same time motor C is energized and its shaft rotated. Rotation of the motor shaft, through pinion 67, spur gear 70, and pinion 74, causes gear 75 and cam wheel 78 to rotate, but at much lower speed. As cam wheel 78 rotates, bolt 89 is prevented from moving toward or away from the hollow shaft 27 because of arm 85 which is connected to fixed bracket 93. To allow rotation of wheel 78, then, the shaft 76 and motor casing must move away from the point on bracket 93 where arm 85 is pivoted. The only way this movement can take place is for motor C and casing A to move about shaft 27 towards the position shown in dotted lines in Fig. 6. Thus it is seen that rotation of cam wheel 78 causes an oscillating movement of the whole lamp casing about shaft 27.

The gearing 56 on top of the motor is also actuated by the motor shaft. Actuation of crank arm 59 serves to move reflector 48 about its pivot at bolts 51 to alternately change the direction of the beam upwardly and downwardly. The relation between the reduction gearing at each end of the motor shaft is preferably such that the reflector will be tipped from forward to rearward position as the casing is being moved in one direction. With this arrangement, in a complete cycle of the oscillating mechanism the reflector would be so moved as to cause the beam from reflector 48 to describe the outline of a figure 8.

Wherever possible the various parts are made adjustable to allow the lamp to be accommodated to varying conditions and situations. For instance, if the highway and railroad do not intersect at right angles but are at some other angle with each other, or if the roads are not at the same horizontal level, it is desirable that the beacon reflector be adjusted to play light upon an approaching train still allowing the signal reflector to project a moving beam across the highway. For such accommodation reflector 49 is made adjustable both vertically and horizontally.

When it is desired to shorten the oscillating movement of the casing, this may be accomplished by loosening nut 91 and sliding bolt 89 inwardly of wheel portion 87 along slot 88, and again tightening nut 91. An opposite adjustment for making the oscillating movement greater is accomplished similarly by moving bolt 89 outwardly in slot 88.

Provision is made also for adjustment of the position of the signal reflector. The crank arm 59 is made in two sections which are slidably connected together by bolt 107, and the arm may be lengthened or shortened by this adjustment. When arm 59 is lengthened the reflector projects a light beam at relatively lower level and when arm 59 is shortened the reflector operates to project light to a relatively higher level.

Because this lamp is a device upon which the safety of motorists may depend, it is very important that the danger of its becoming out of order be reduced to a minimum. To this end is here provided auxiliary lighting means which is automatically energized when the main lighting circuits cease to function. As, when the filament 99, which may be rated to burn 1000 hours, burns out, the relay 97 is de-energized and arm 108 of the relay, being pressed by a spring, makes contact through post 100, and thus completes the circuit through filament 101. Filament 101 may be rated to burn 250 hours for it is necessary for this filament to burn only until a repairman can make replacements. When the auxiliary circuit is completed the trouble lamp 102 in the side of the casing also is lighted to indicate to an inspector or repairman that the main circuit is not functioning. In this way repair or replacement may be made before the device becomes inoperative. The same may be said as to the operation of the auxiliary equipment in the beacon lamp circuit.

Figures 4, 5:
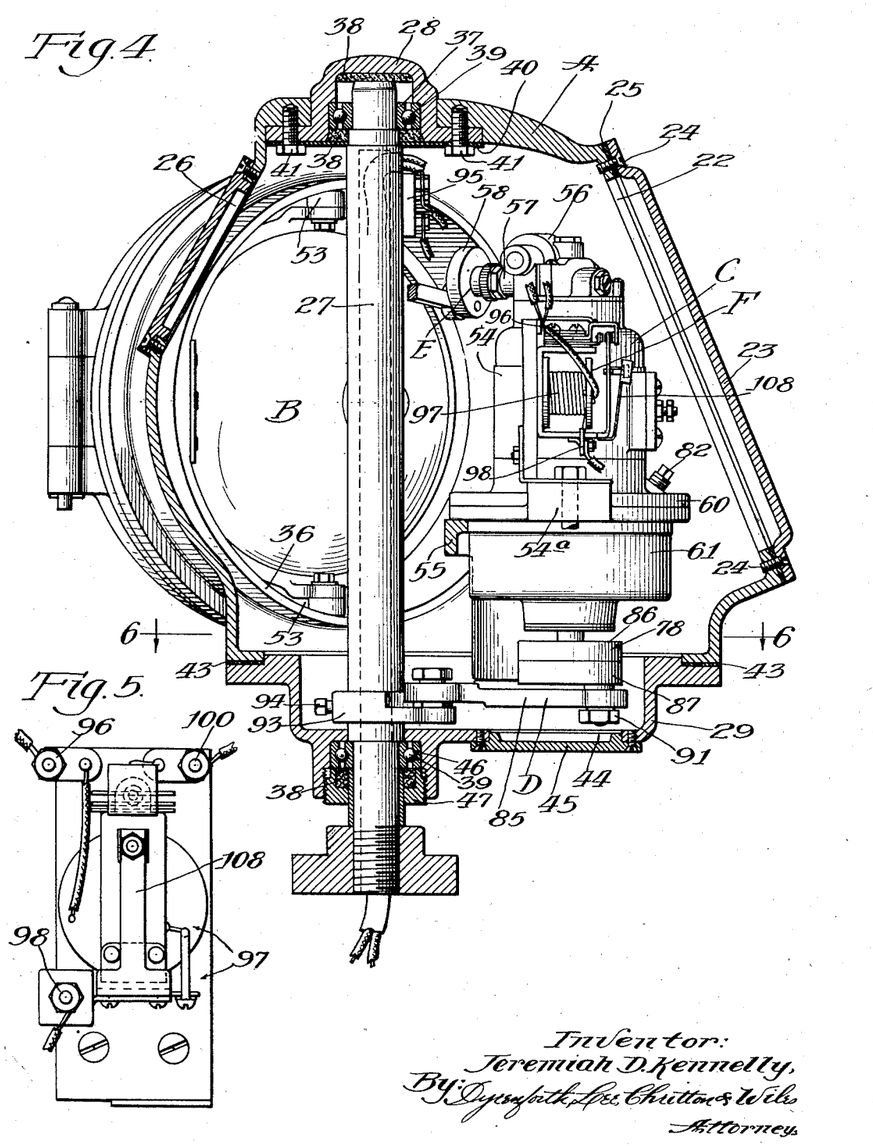
Fig. 4, a view in side elevation of the lamp interior, the casing being shown in section as indicated at line 4—4 of Fig. 2.
Fig. 5, a detail view of the relay mechanism.

An advantage is gained in the operation of the lamp by the manner in which the bearings are secured. As seen in Fig. 4, for example, the bearings 37 and 46 are held at their inside portions only by the shaft and are held at their outside portions only by the casing, so that the shaft is in frictional contact with the casing only through the balls 39 of the bearings.

Also an advantage is gained in the lubrication of the motor reduction gearing for the oscillating mechanism by the provision of pan 79.

This pan revolves with the gear 75 and though it be only partly filled with oil, the oil is carried upwardly around the edges and into contact with gear 70 and other parts of the gearing mechanism.

Figure 20:
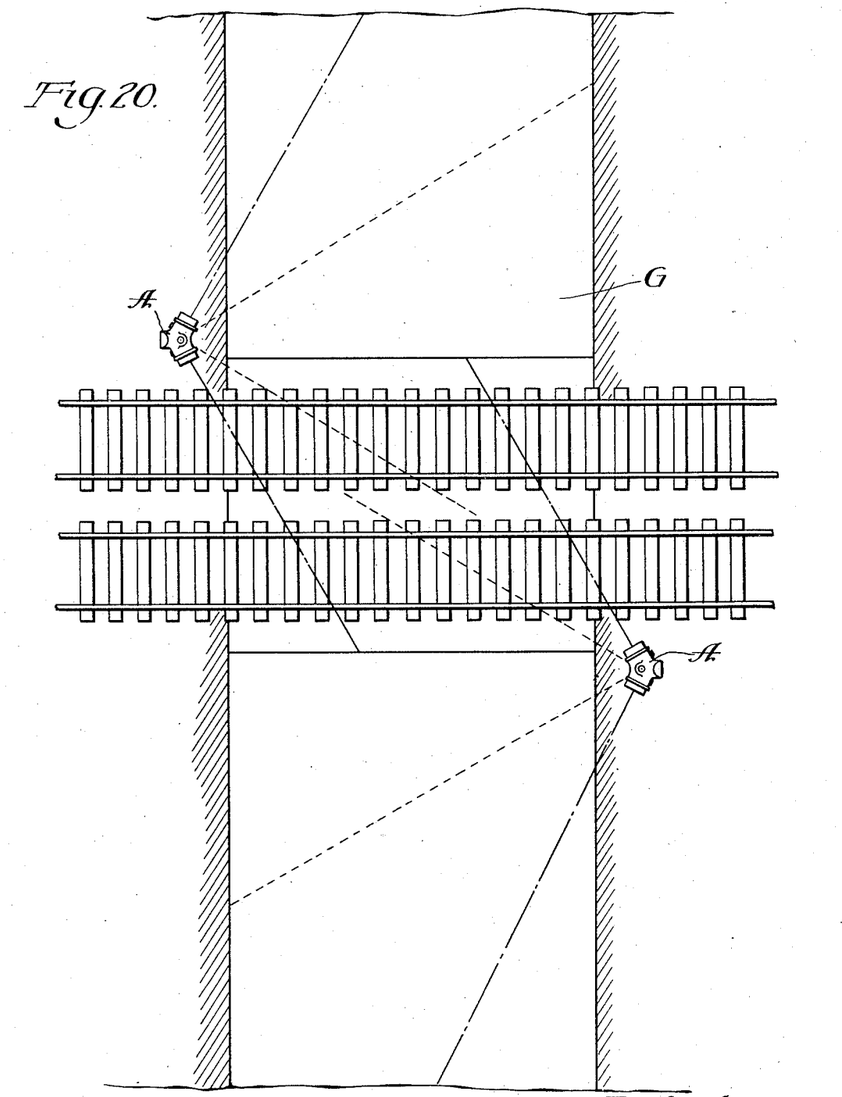
Fig. 20, a plan view showing a pair of the signal lights mounted on opposite sides of a railway track and highway crossing.

In the illustration given in Fig. 20, one of the signal light structures is mounted on one side of the railroad and another signal light is mounted diagonally across the track from it. The lamp structures are thus on the opposite sides of the railroad track and also on opposite sides of highway, indicated by the letter G. As shown by the direction lines, rays of light from one of the lens directed toward the railroad move back and forth across the railroad and highway through an arc of approximately 60°, the band of light from the lens being approximately 10° in width. The warning light from the other lens sweeps across the road at some distance from the track so as to warn the automobile driver coming from that direction. The concentrated beam of light thrown is approximately 10° wide and it sweeps through a circuit of approximately 60°. Thus, rotation of the casing A simultaneously sweeps a warning light across the roadway leading toward the railroad and another illuminating light across that portion of the track lying within the highway G. The operation of the two lights, thus angularly related, through the fact that they are in unison cannot fail to attract the attention of the motorist so as to cause him to stop a car in time. Should a freight train be very slowly moving on the track across the highway, the movement of the concentrated beam along the track reveals the end of the car and the irregularities therein so that it becomes readily visible to the approaching motorist.

Though in the foregoing description I have set out a very specific structure, it will be understood that many changes may be made in the construction without departing from the spirit of my invention. In the illustrations I have shown structure in which light beams diverge at an angle of approximately 120°, but this new angle may be changed if desired to suit prevailing situations.

I claim:

1. In a signal device of the character set forth for use with a highway and railway crossing, a frame, a pair of light-projecting devices supported in said frame and arranged to direct at least two angularly related concentrated beams of light, one of said beams being adapted to move across said railway crossing and the other of said beams, extending along said highway away from said crossing, being adapted to be moved across said highway at a distance from said crossing, and means for oscillating said light-projecting devices.

2. In a signal device of the character set forth for use with a highway and railway crossing, a frame, a pair of light-projecting devices supported in said frame and arranged to direct concentrated beams of light in two directions, one of said beams extending across the railway crossing for illuminating railway cars thereon and the other of said concentrated beams extending along the highway away from the said crossing, and means for oscillating said device to cause said beams of light to move in unison across said highway and across said railway crossing.

3. In a signal device of the character set forth for use with a highway and railway crossing, a frame, a pair of light-projecting devices supported on said frame, one of said light-projecting devices being arranged to direct a beam upon said railway crossing and the other device being arranged to direct a second beam along said highway away from said crossing, means for moving said light-projecting devices to cause horizontal movement of said light beams, whereby said first mentioned beam is moved across said crossing and said second mentioned beam is moved across the highway, and means for actuating said other light-projecting device for vertical movement of said second-mentioned beam.

4. In a signal device of the character set forth for use with a highway and railway crossing and adapted to be placed adjacent the crossing, a frame, means for pivotally supporting said frame, a pair of light-projecting devices supported in said frame, one of said devices being supported so as to project light rays horizontally across the highway at the crossing and the other of said devices being tiltably supported and arranged to project light rays upon the highway in advance of the crossing, and motor actuated means for tilting said other device to sweep the beam of light up and down the highway.

5. In a signal device of the character set forth for use with a highway and railway crossing and adapted to be placed adjacent the crossing, a frame, means for pivotally supporting said frame, a pair of light-projecting devices supported in said frame, one of said devices being supported so as to project light rays across the highway at the crossing and the other of said devices being tiltably supported and arranged to project light rays upon the highway in advance of the crossing, a motor supported in said frame, means associated with said motor for oscillating said light-projecting devices in a substantially horizontal plane, and means associated with said motor for tilting one of said devices in a vertical plane.

6. In a signal device of the character set forth for use with a highway and railway crossing and adapted to be placed adjacent the crossing, a frame, means for pivotally supporting said frame, a pair of light-projecting devices supported in said frame, one of said devices being supported so as to project light rays across the highway at the crossing and the other of said devices being tiltably supported by said frame and arranged to project light rays upon the highway in advance of the crossing, a motor having its casing secured in said frame, means for connecting said motor with said support so that continuous rotation of said motor oscillates said frame about its pivot to move said light-projecting devices in a substantially horizontal plane, and means actuated by said motor for tilting one of said devices, the relation between said tilting means and said oscillating means being such that said tilting means is caused to tilt the device both forwardly and rearwardly as said oscillating means moves the frame in one direction.

JEREMIAH D. KENNELLY.